UNITED STATES PATENT OFFICE.

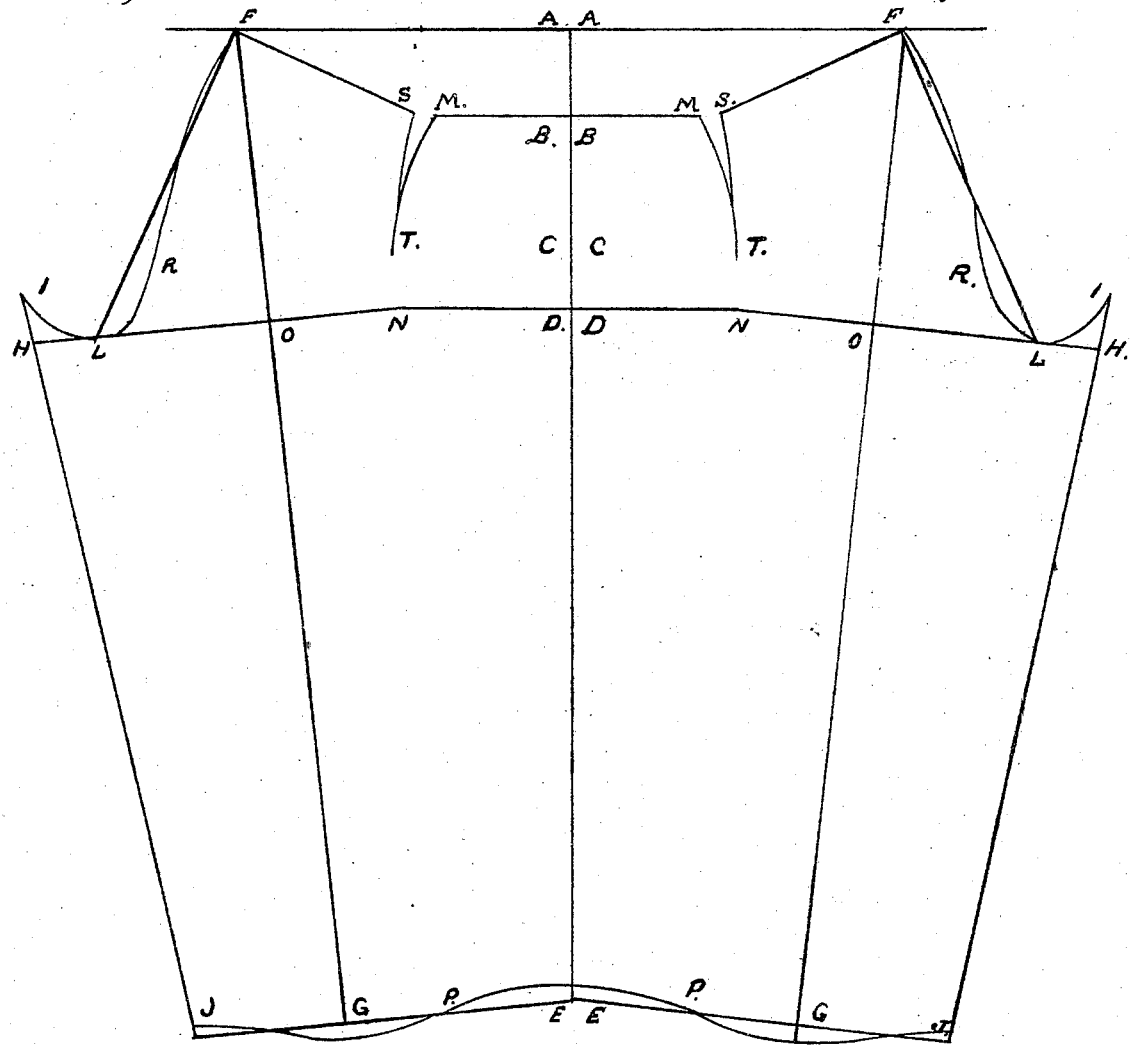

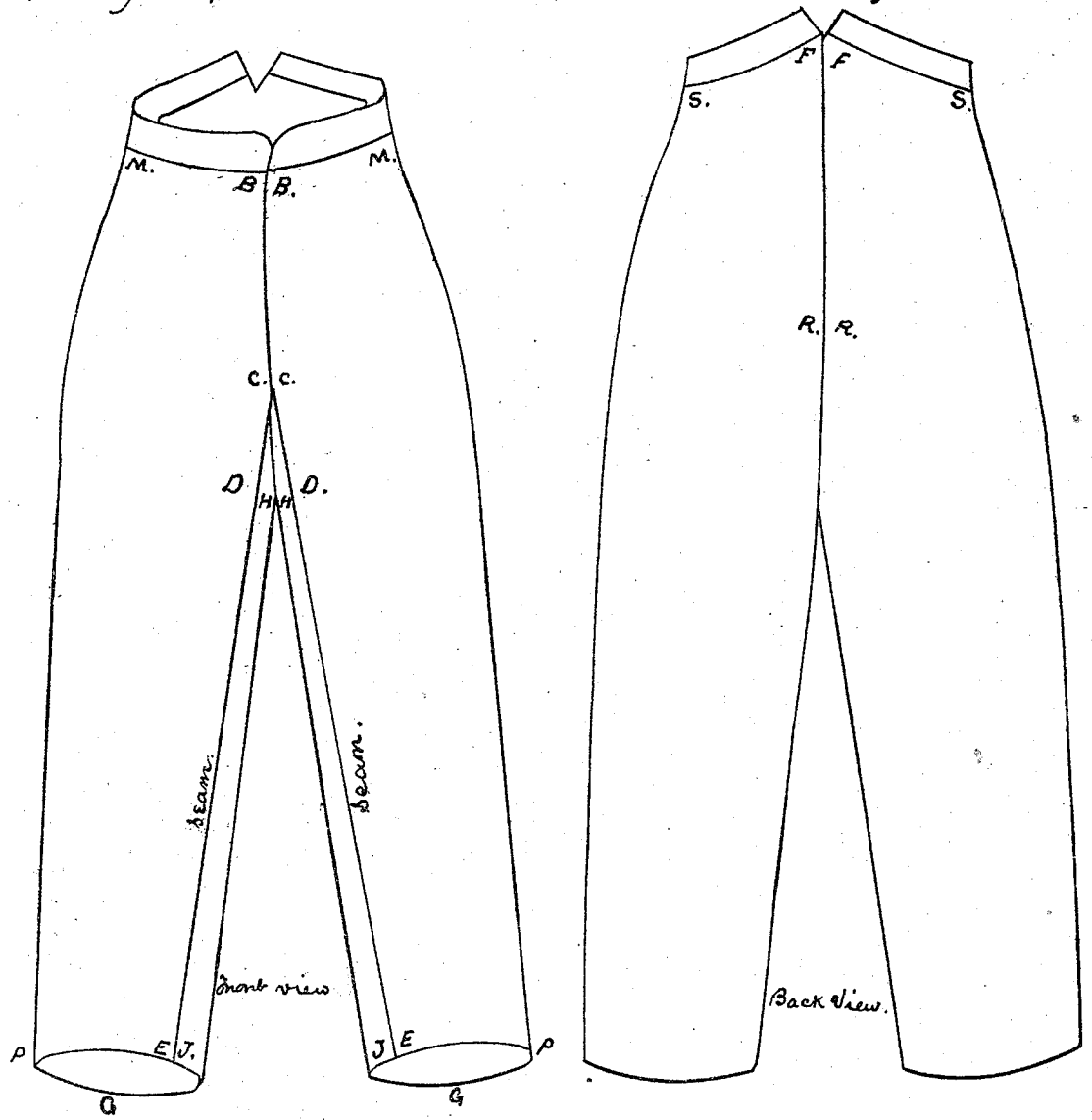

HARMON OSLER, OF PHILADELPHIA, PENNSYLVANIA.

IMPROVEMENT IN PANTALOONS.

Specification forming part of Letters Patent No. 39,584, dated August 18, 1863.

*To all whom it may concern:*

Be it known that I, HARMON OSLER, of Philadelphia, in the State of Pennsylvania, have invented a new and Improved Garment Having Legs; and I do hereby declare that the following is a full and exact description thereof, reference being had to the accompanying drawing, and to the letters of reference marked thereon.

The nature of my invention consists in making pants and analogous garments, each leg thereof being one entire piece of fabric, having but one seam, which commences at the bottom of the fore part, and runs up in a line with the opening in front.

To enable others skilled in the art to make use of my invention, I will proceed to describe its construction and operation.

I take the measure for pants, drawers, overalls, or other garments, having legs, as follows: No. 1, length from the waistband in front at B to the bottom E; No. 2, length from the crotch at L to the bottom E; No. 3, around the waist above the hips; No. 4, around the seat; No. 5, around the bottom of the pants. I then proceed to construct the garment by dividing the half of the seat (No. 4) measure into thirds, fourths, sixths, eighths, twelfths, sixteenths, twenty-fourths, thirty-seconds, and forty-eighths. I then make a straight line parallel to the edge of the cloth, as A E, and measure from A to B one-sixth and one thirty-second, to find the top of the pants. From B, I measure to E the length of the pants, (measure No. 1,) and from E, I measure back again to D the length of the crotch-measure, (No. 2,) and from D to C one-sixth and one thirty-second. At the points A B C, I make lines at right angles with the line A E, and measure from A to F three-thirds, (being one-half of the seat-measure,) from B to M one fourth of the waist (No. 3) measure, D to N one-half of the divided seat-measure, E to J the width of the bottom, (No. 5,) and from E to G one-half of the width of the bottom, adding one and one-half inch. I then draw a straight line from F to G, and make a line at right angles therewith from such a point, O, thereon, that when produced it strikes the point N. I then continue the same line the opposite direction to L and H straight with the points N and O. The line E G, I also produce to J, taking care, however, to have it at right angles with the line F G. I then measure from O to L five-twelfths, from L to H one-sixth. I then draw a straight line from J through H to I, and make it the same length as from E to G, then measure from E to P five-sixteenths, and from the bottom, as shown by the curved lines in the drawing, commencing three-fourths of an inch above E, and curving to the same distance below G to the same distance below J. I then draw a straight line from L to F, and another from F to M, and measure from O to R one-third, and form the seat, as shown by the curved lines in the drawing. I measure from F to S one-fourth of the waist (or No. 3) measure, adding one and one-half inch, and form the gore for the pocket, as S M T. The dotted lines will represent a saddle-piece, as used in cavalry pants.

In making up, place C to I and E to J, and sew up the seam on each leg, and joint the garment in the usual way. The pockets are inserted in the gore above mentioned.

The advantages of this improvement are, economy in material and work and comfort to the wearer—

First. By avoiding the two outside seams there is a gain of sixty-three square inches of fabric in each pair. In one hundred thousand pairs this is equal to six thousand four hundred and eighty-one and one-half yards of fabric.

Second. There being but one seam in each leg, the expense of thread, cutting, and making is proportionately reduced.

Third. This position of the seam allows the garment to be laid on the edge of the goods to the best advantage.

Fourth. The seam running in front of instead of into the crotch, avoids all chafing in that region.

What I claim as my invention, and desire to secure by Letters Patent, is—

A garment having legs, each leg formed by the sutures C I D H E J, substantially as shown and described.

HARMON OSLER.

Witnesses:
H. OSLER, Jr.,
WILLIAMS OGLE.